United States Patent Office 3,568,408
Patented Mar. 9, 1971

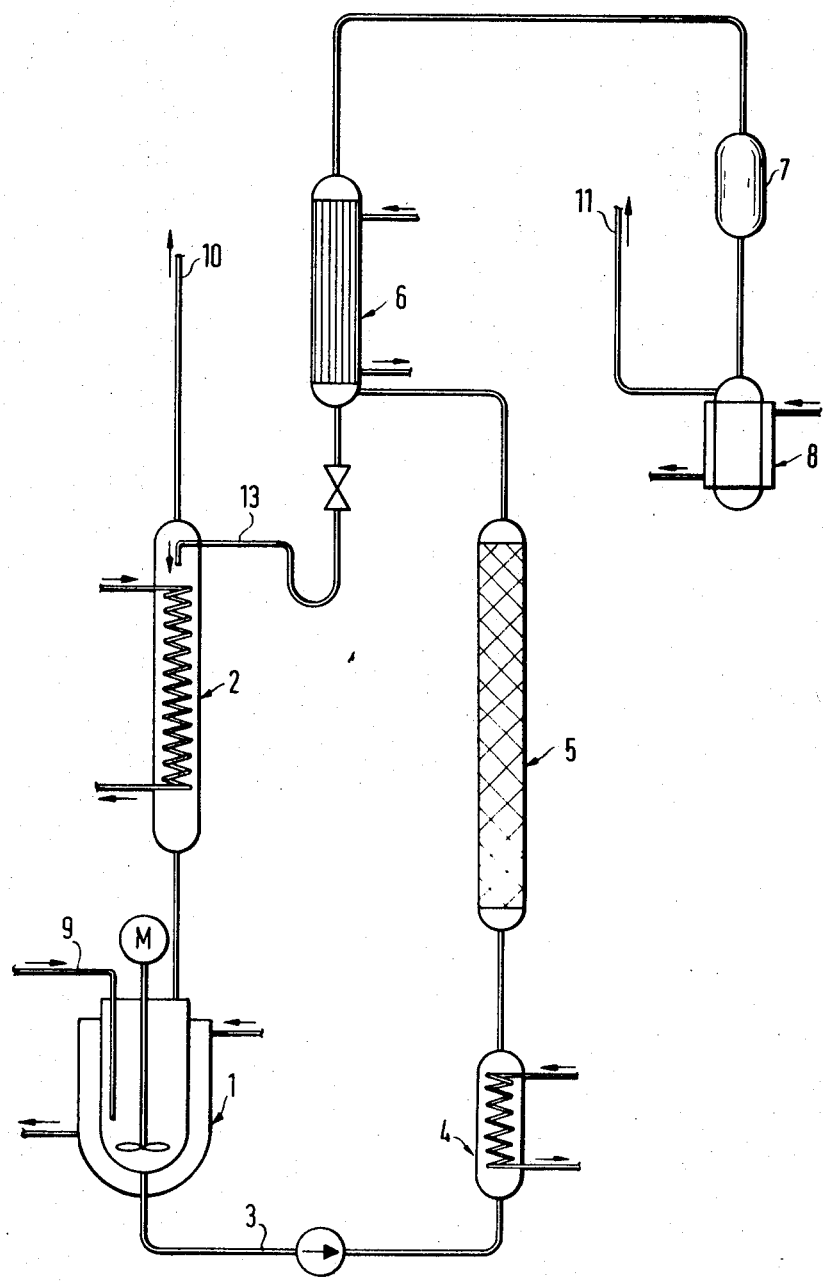

3,568,408
CONTINUOUS PROCESS FOR THE RECOVERY OF USEFUL COMPONENTS OF A GASEOUS MIXTURE FORMED IN THE CATALYTIC PRODUCTION OF CYANOGEN CHLORIDE FROM HYDROCYANIC ACID AND CHLORINE OR IN THE SUBSEQUENT TRIMERIZATION OF CYANOGEN CHLORIDE TO CYANURIC CHLORIDE IN THE VAPOR PHASE
Jean Riethmann, Allschwil, Basel-Land, and Leo Scheck, Benken, Basel-land, Switzerland, assignors to Geigy Chemical Corporation, Ardsley, N.Y.
Filed July 8, 1969, Ser. No. 839,933
Claims priority, application Switzerland, July 10, 1968, 10,296/68
Int. Cl. B01d 53/00
U.S. Cl. 55—71
5 Claims

ABSTRACT OF THE DISCLOSURE

A continuous process for the recovery of components of a gaseous mixture formed in the catalytic production of cyanogen chloride or in the subsequent trimerization of the cyanogen chloride to cyanuric chloride in the vapor phase is described which comprises removing from the gaseous mixture consisting substantially exclusively of chlorine, hydrogen chloride and cyanogen chloride the hydrogen chloride by absorption in pentachlorethane; the residual mixture of chlorine and cyanogen chloride can be recycled into the aforesaid process for producing cyanuric chloride.

DESCRIPTION OF THE PRIOR ART

Various processes are known for producing cyanuric chloride in the vapor phase by catalytically trimerizing cyanogen chloride at raised temperatures. The cyanogen chloride to be trimerized is also obtained catalytically at raised temperatures in the vapor phase from dry mixtures of hydrocyanic acid (HCN) and chlorine ($Cl_2$). The cyanogen chloride (ClCN) thus formed can be freed from hydrogen chloride which was also formed, and trimerized to cyanuric chloride in a further operation. Preferred, however, are direct processes which proceed directly to the following trimerization to cyanuric chloride without isolation of the cyanogen chloride formed from hydrocyanic acid and chlorine as intermediate product, according to the following reaction scheme:

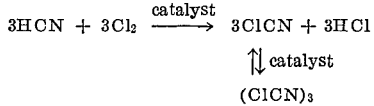

According to French Pat. 1,231,189, this reaction is performed in one operation using active charcoal as catalyst at excess pressures of from 2 to 40 atmospheres and at temperatures considerably above 300° C. employing practically stoichiometrical amounts of hydrocyanic acid and chlorine. The cyanuric chloride is separated as a liquid. A similar process proceeding under normal pressure is also known (U.S. Pat. 2,762,798).

According to French Pat. 1,311,400, the trimerization of the cyanogen chloride to cyanuric chloride is performed in the presence of chlorine gas, thus enabling prolongation of the activity of the catalyst and considerable reduction of the trimerization temperature. In this case also, active charcoal is the preferred catalyst. To carry out this direct process, a considerable excess of chlorine, ca. 50%, is employed in the chlorine/hydrocyanic acid mixture required; although, in this manner, the trimerization temperature can be reduced to 250° C., this shifting the equilibrium in favor of the cyanuric chloride, on the other hand, however, the reaction then proceeds relatively slowly and large quantities of catalyst are required.

In the industrial performance of the process according to French Pat. 1,311,400, therefore, a dry gas mixture of hydrocyanic acid and chlorine is passed over active charcoal at 350° C., which due to the excess chlorine remains active for prolonged periods. At the reactor discharge the cyanuric chloride, formed by the polymerization of the intermediarily resultant ClCN, desublimates with yields of about 80%. The residual gas consisting of hydrogen chloride, chlorine and cyanogen chloride, is likewise passed over active charcoal at 350° C. in a second reactor. More cyanuric chloride (about 15–18% more) then desublimates. The residual gases then contain greater amounts of hydrogen chloride (45–50 weight-percent), chlorine (45–55 weight-percent) and lesser amounts of cyanogen chloride (1–5 weight-percent). The average volume ratio of these gases is 65:33:2.

In all of the above-described processes for the production of cyanogen chloride or of cyanuric chloride by trimerizing the cyanogen chloride in the vapor phase, ternary gas mixtures are obtained which consist practically exclusively of chlorine, cyanogen chloride and hydrogen chloride. Depending on the process employed, the amounts of these three components can fluctuate considerably. If the trimerization is not carried out directly after the production of the cyanogen chloride, the amount of cyanogen chloride in the gas, besides the hydrogen chloride, is relatively high. When, however, the trimerization to cyanuric chloride follows directly after the formation of the cyanogen chloride in a direct process, the residual gas consists, after desublimation of the resultant cyanuric chloride, substantially of chlorine and hydrogen chloride, in addition to a little non-trimerized cyanogen chloride.

In all of these processes, therefore, it is of the utmost economic importance to remove as completely as possible from this residual gas mixture the hydrogen chloride making up the major part by volume thereof, and in as pure a form as possible and/or in as high concentrations as possible, so that the other two components, chlorine and cyanogen chloride, can be returned, preferably continuously into the cycle for the catalytic production of cyanuric chloride.

Previously, one of the following methods has been used:

(1) The residual gas mixture is blown away or quantitatively destroyed in lye. Besides being highly uneconomical, the danger of air and water pollution is great.

(2) The hydrogen chloride is washed out of the residual gas mixture with water (French Pats. 1,231,189 and 1,311,400). This process has the great disadvantage that practically worthless, strongly diluted hydrochloric acid is obtained anl the remaining gases, chlorine and cyanogen chloride, must be dried again before returning to the cycle. In addition, the resultant aqueous hydrochloric acid saponifies a greater or lesser amount of the valuable cyanogen chloride, and indeed, the higher the concentration of the waste hydrochloric acid, the greater the saponification. For this reason, it is not possible to operate a separation process based on the extraction of hydrogen chloride with water economically in such a manner that the unreacted cyanogen chloride is recovered quantitatively and, at the same time, to obtain as by-product a technically acceptable hydrochloric acid of commercial concentration. Either the concentrated aqueous hydrochloric acid or the greater part of the valuable cyanogen chloride must be relinquished.

It is also known that even the slightest traces of water irreversibly disrupt the mechanism of the trimerization by poisoning the catalyst, so that, before returning it to the manufacturing process, it is absolutely necessary to submit the gas mixture obtained by the separation with water, consisting of chlorine and cyanogen chloride, to a very thorough and therefore expensive drying operation.

(3) The gases are separated by absorption, in particular by means of active charcoal, from the hydrogen chloride which is not retained (French Pat. 1,231,189; U.S. Pat. 3,338,898). Although it is now easy to recover the hydrogen chloride which has been freed from impurities, either in anhydrous form or as highly concentrated hydrochloric acid, the return to the cycle of the residual gases absorbed on the charcoal is connected with difficulties resulting from having to handle solid substances in an atmosphere of poisonous gases. In addition, the yield of gases which can be recycled is moderate.

It is also known to separate mixtures of chlorine and hydrogen chloride with the aid of solvents by selective absorption (Ullmann, 3rd ed., vol. 15, page 81; German Pat. 1,104,517; British Pat. 983,694; and U.S. Pat. 2,841,-243). Thus according to U.S. Pat. 2,841,243, pure hydrogen chloride is obtained by treating a mixture of hydrogen chloride and chlorine with a low boiling halogenated solvent such as carbon tetrachloride or perchloroethylene to remove the chlorine, and treating the resultant gas mixture containing the vapors of this solvent with a second, higher boiling solvent which dissolves the vapors of the solvent. Suitable as the second, higher boiling solvent are preferably hexachlorobutadiene and trichlorobenzene.

It is therefore not possible to employ this relatively complicated process (two different solvents!) for the separation of ternary mixtures of hydrogen chloride, chlorine and cyanogen chloride because it is known that cyanogen chloride polymerizes in such solvents in the presence of hydrogen chloride. Thus Canadian Pat. 399,464 describes the polymerization of cyanogen chloride to cyanuric chloride in carbon tetrachloride in the presence of HCl. In Chem. Abstr. 61, 9160 (1964), a publication by Kodama et al. is reviewed (J. Soc. Org. Syn. Chem., Japan) in which it is mentioned that in chlorinated hydrocarbons such as $CHCl_3$, $C_2H_4Cl_2$, and $C_2H_2Cl_4$ in the presence of HCl also at raised temperatures, a polymerization of cyanogen chloride to tri- and tetramers takes place.

Surprisingly, it has now been found that when pentachloroethane is used as the solvent for the selective separation of hydrogen chloride on the one hand and chlorine and cyanogen chloride on the other from the ternary mixture of $HCl+Cl_2+ClCN$, no polymerization of the cyanogen chloride takes place, and that this solvent has a number of other valuable and essential properties: It has the necessary high boiling point (162° C.) to prevent its escape in large quantities with the gases being generated. It is relatively stable to chlorine, and the slight amount of hexachloroethane formed by chlorination is stable and can be easily separated from the gases.

A series of tests showed that no other solvent is better suited for the intended purpose of selective absorption of the ternary gaseous mixture.

DESCRIPTION OF THE INVENTION

The present invention relates to a continuous process for the recovery of useful components of a gaseous mixture formed in the catalytic production of cyanogen chloride from hydrocyanic acid and chlorine and/or in the subsequent trimerization of the cyanogen chloride to cyanuric chloride in the vapor phase, enabling to solve the problem of separating the hydrogen chloride from the gas mixture resulting in the production of cyanogen chloride and cyanuric chloride in a very satisfactory manner.

The continuous process according to the invention for the recovery of useful components of a gaseous mixture which is formed in the catalytic production of cyanogen chloride from hydrocyanic acid and chlorine, or which is formed during the subsequent trimerization of cyanogen chloride to cyanuric chloride in the vapor phase after condensation of the latter comprises introducing a gaseous mixture consisting substantially, exclusively, of chlorine, hydrogen chlorine and cyanogen chloride free from water into an absorber containing pentachloroethane, said absorber being connected with an evaporator into which the pentachloroethane, containing essentially chlorine and cyanogen chloride dissolved therein, flows from the absorber, driving off the hydrogen chloride gas which is only sparingly soluble in pentachloroethane preferably by heating said absorber to 30–80° C., and heating the solution in the evaporator to reflux temperature, condensing the solvent from the vapors and recycling it into the absorber; whereas the gas mixture which does not condense, consisting mainly of chlorine and cyanogen chloride, is reused.

The preferred temperature in the absorber is about 70° C., while the evaporator is operated at the reflux temperature of the pentachloroethane (boiling range 159–164° C.). At these temperatures, the best results relative to selectivity, quality and yields are obtained. The solubility of chlorine in pentachloroethane at 70° C. is 2.3%, the solubility of cyanogen chloride is 8.6%; whereas the solubility of HCl is only about 0.1%. The reflux should be so regulated that a solution of chlorine and cyanogen chloride which is as saturated as possible is obtained in the absorption vessel; at an addition rate of 5.7 parts by weight of chlorine per hour, this corresponds to a reflux of 230–240 parts by weight of pentachloroethane. With relatively small reflux quantities (concentrated solutions), the separation is improved. When the process is performed in practice, however, the amount of the refluxing solvent can be considerably higher.

The separation process according to the invention, therefore, is based on the differing solubility in pentachloroethane of the gases obtained in the production of cyanogen chloride from hydrogen chloride and excess chlorine, or after the catalytic trimerization of cyanogen chloride to cyanuric chloride. The gaseous mixture is introduced with stirring into an absorber charged with pentachloroethane. The chlorine and cyanogen chloride dissolve in the solvent, whereas only traces of HCl dissolve. The absorber is connected in such a way with an evaporator by means of an outlet at the bottom that part of the solution in the evaporator can always flow, whether based on the principle of communicating containers or by pumping into the evaporator. The amount of liquid in both containers (absorber and evaporator) should be about equal; one of the containers, however, can contain a little more liquid than the other. Preferably the absorber and the evaporator are protected against light, e.g. by means of aluminum foil, to avoid as much as possible the chlorination of the pentachloroethane to hexachloroethane. Above the absorber, which is also provided with openings for introduction of gas, thermometer, agitator and optionally for immersion heating or cooling systems, a reflux condenser is mounted, which is operated at 0–5° C. The heatable evaporator with an inlet at the bottom has a heatable fractionating column, above which a reflux condenser has been attached, which is operated at about 20–30° C. with a coolant. The evaporator is heated above the boiling temperature of the pentachloroethane, whereby the solvent evaporates, taking the chlorine/cyanogen chloride gas mixture with it. In the reflux condenser the solvent condenses and flows as a liquid out of this reflux condenser, preferably via the condenser of the absorber back into the latter; whereas a mixture of chlorine and cyanogen chloride, contaminated with a little HCl and pentachloroethane vapors which hace been carried along, is removed from the top of the reflux condenser. It is advantageous to then conduct this gas mixture into a chlorinating reactor in order to chlorinate the pentachloroethane vapors which have been carried along, by means of ultraviolet radiation to solid hexachloroethane and then separating the latter in a liquid-air trap. The remaining gases (chlorine, cyanogen chloride and a little hydrogen chloride) are returned then to the apparatus for the production and trimerization of cyanogen chloride.

The undissolved, dry hydrogen chloride is driven off from the contents of the absorber which preferably have been heated to 30–80° C., in particular to 70° C. (optimal selectivity). After a certain length of time an equilibrium is reached between the amount of gases introduced (gas mixture to be separated), the reflux quantities of solvent and the separated gases driven off (HCl on the one hand, and $Cl_2+ClCN$ on the other).

The loss of solvent due to the partial pressure of the pentachloroethane (4 mm. Hg at 20° C., 1 mm. Hg at 0° C.) is slight and after an operation time of 236 hours only amounts to 1.16 weight percent of the solvent employed; this loss can be substantially reduced by chlorinating the gaseous pentachloroethane, which was carried along, to hexachloroethane in the ultraviolet chlorinating reactor (partial pressure of hexachloroethane at 30° C.=0.4 mm. Hg).

The undesirable chlorination of the pentachloroethane in liquid phase (as solvent in absorber and evaporator) can, besides protecting the apparatus against light, also be prevented or substantially reduced by adding a little iodine (about 0.3 g. of iodine per liter of pentachloroethane). The not entirely avoidable chlorination to hexachloroethane, which accumulates in the pentachloroethane, amounts after prolonged operation (236 hours) to 18–20% and does not exceed this amount.

Comparative tests with carbon tetrachloride which can not be chlorinated, due to the boiling point of this solvent being too low, resulted in unsatisfactory separation of the gases, high loss of solvent and polymerization of the cyanogen chloride.

Tests with aromatic solvents indeed yielded a good separation, but after a short time already, there was a complete chlorination to solid hexachlorobenzene (M.P. 227° C.).

Of all the organic solvents tested, only pentachloroethane is suitable for an economical performance of the gas separation process.

That the process according to the invention can be performed, namely the separation of HCl from the other two components $Cl_2+ClCN$ by selective absorption by means of a halogenated aliphatic hydrocarbon must be extremely surprising to an expert, because of the polymerization of cyanogen chloride to cyanuric chloride which does not take place. The invention thus overcomes a great projudice.

From the above-cited literature, the conclusion would have to be drawn that a separation of HCl from mixtures of cyanogen chloride, HCl and $Cl_2$ by selective absorption in halogenated hydrocarbons would be impossible due to the long duration, since a practically quantitative polymerization of the cyanogen chloride to cyanuric chloride and tetrameric cyanogen chloride would have been expected.

A trimerization of the cyanogen chloride, however, during the separation of the residual gases is undesirable. On the one hand, the separation of the cyanuric chloride formed would be complicated, requiring equipment, which in view of the small amount of cyanuric chloride (1–2% of the residual gas) would not be economically feasible; on the other hand, by the polymerization in the liquid phase, there is a strong tendency for the formation of larger amounts of undesirable tetrameric cyanogen chloride instead of cyanuric chloride. For economic reasons, therefore, a polymerization of the cyanogen chloride during the separation of the residual gases must be avoided.

According to the invention it is possible in a simple and industrially feasible way to return the cyanogen chloride and chlorine of the residual gases back into the cycle of the production and trimerization of cyanogen chloride and simultaneously to recover practically pure hydrogen chloride which is commercially well utilizable.

The gas mixture to be separated may sometimes contain traces of $CO_2$ $COCl_2$, which however does not affect the performance of the separation process according to the invention.

The practically pure hydrogen chloride which has been recovered is converted into readily utilizable aqueous hydrochloric acid by introducing it into water. The mixture of chlorine and cyanogen chloride obtained on the other hand is mixed in gaseous form with the starting materials of the manufacturing operation (hydrocyanic acid and chlorine) and reintroduced into the reactor for the production of cyanogen chloride and cyanuric chloride.

The apparatus which may, for example, be used for the performance of the process according to the invention is illustrated more fully by the accompanying schematic drawing:

An absorber 1, fitted with a power agitator driven by motor M and with a steam jacket, is furnished with a supply conduit 9 for the gases to be separated and is connected below by a conduit 3 with the evaporator 4 having heating means. The passage of the liquid from the absorber 1 to the evaporator 4 proceeds through this conduit 3 in which a feed pump may be interposed. Above the absorber 1 a condenser 2 has been mounted, having the outlet conduit 10 at the upper end thereof for the hydrogen chloride which separates.

Above the evaporator 4, a distillation column 5 is arranged, preferably charged with glass beads (cross hatched), from which column the vapors are conducted into a reflux condenser 6. The returning solvent flows back through the conduit 13 and the condenser 2 into the absorber 1. A conduit connects the upper part of the reflux condenser 6 with an ultraviolet-chlorinating reactor 7, and another connects the latter with the separator 8 (liquid-air trap) for the solid hexachloroethane. The chlorine/cyanogen chloride phase leaves through the outlet conduit 11 and can be conducted from there back into the reactor for the production of cyanogen chloride and cyanuric chloride.

The following example illustrates the process according to the invention:

Example:

The absorber 1 is charged with 1000 parts by volume (1677 parts by weight) of pentachloroethane and 0.3 part by weight of iodine, and conduit 3 being open, stirred with the agitator M at about 500 revolutions per minute. The amount of pentachloroethane is so distributed between the absorber 1 and the evaporator 4 that 592 parts by volume (992 parts by weight) of the pentachloroethane are in the absorber and 408 parts by volume (685 parts by weight) are in the evaporator. The following temperatures are then set and maintained:

| | Degrees C. |
|---|---|
| Condenser 2 | 0–5 |
| Condenser 6 | 30 |
| Absorber 1 | 70 |
| Evaporator 4 | 160 |
| Column 5 | 160–165 |

The reflux control in the conduit 13 is so set that 400 parts by weight per hour of pentachloroethane flow back into the absorber 1.

The residual gases from the catalytic production of cyanuric chloride according to French Pat. No. 1,311,400, consisting of 48.8 percent by weight of hydrogen chloride, 47.5 weight percent of chlorine and 3.7 weight percent of cyanogen chloride, are then conducted through the conduit 9 at a rate of 11.96 parts by weight per hour (i.e. 5.84 parts by weight of HCl, 5.68 parts by weight of $Cl_2$ and 0.44 part by weight of ClCN per hour) into the absorber. The apparatus is operated continually for a total of 236 hours. The optimum gas separation commences after about 24 hours. The gases leaving the evaporator at the top of condenser 6 are contaminated with pentachloorethane which is taken along. To separate the solvent which has been taken along, this is practically completely chlorinated in reactor 7 by ultraviolet radiation at room temperature and the hexachloroethane formed is separated in solid form in the liquid-air trap 8.

After equilibrium has been attained, the following yields were obtained:

|  | Percent |
|---|---|
| Proportion of the total HCl at outlet 10 | 85.7 |
| Proportion of the total chlorine at outlet 11 | 98.9 |
| Proportion of the total cyanogen chloride at outlet 11 | 100.0 |

The composition of the discharging gases was the following:

outlet 10: 98.4% HCl, 1.6% Cl$_2$
outlet 11: 81.7% Cl$_2$, 11.1% HCl, 7.2% ClCN.

After 236 hours of operation the solvent had the following composition (gas chromatographic determination):

|  | Pentachlorothane, percent | Hexachlorothane, percent | Other substances, percent |
|---|---|---|---|
| In the absorber | 67 | 17 | 16 |
| In the evaporator | 76 | 20 | 4 |

The values listed above for HCl, Cl$_2$ and ClCN were determined analytically. The gases from the conduit 10 were absorbed for 24 hours in water and then the hydrochloric acid and the chlorine were determined titrimetrically.

The gases from the conduit 11 were absorbed in aqueous potassium iodide solution and the hydrochloric acid and the chlorine were determined titrimetrically. The cyanogen chloride analysis was made by analytical determination of the nitrogen in the solution.

At higher absorption temperatures (70° C.), the quality and yield of the separated gases is better than at lower absorption temperatures (e.g. 30° C.). On the other hand, at 70° C. more of the solvent is chlorinated to hexachloroethane.

By the addition of iodine as chlorination inhibitor and protecting the apparatus against light, the chlorination of the pentachloroethane can be practically avoided during the first 100 hours of operation.

We claim:
1. A continuous process for the recovery of useful components of a gaseous mixture which is formed in the catalytic production of cyanogen chloride from hydrocyanic acid and chlorine, or which is formed during the subsequent trimerization of cyanogene chloride to cyanuric chloride in the vapor phase after condensation of the latter, which comprises
(a) introducing a gaseous mixture consisting substantially exclusively of chlorine, hydrogen chloride and cyanogen chloride free from any water into an absorber containing pentachloroethane;
(b) passing continuously pentachloroethane containing essentially chlorine and cyanogen chloride dissolved therein from the absorber to an evaporator;
(c) removing from the absorber the hydrogen chloride gas which is only sparingly soluble in pentachloroethane;
(d) heating the solution in the evaporator to reflux temperature;
(e) condensing the solvent from the vapor mixture from the evaporator thereby removing the same from the mixture, and
(f) drawing off the remaining uncondensed vapor mixture consisting essentially of chlorine and cyanogen chloride.

2. A process as described in claim 1, further comprising heating the absorber to 30-80° C. to drive off the hydrogen chloride.

3. A process as described in claim 1, further comprising recycling into the absorber the solvent condensed and removed from the vapor mixture from the evaporator.

4. A process as described in claim 1, further comprising adding iodine to the pentachloroethane in the absorber to prevent or substantially reduce the chlorination of the pentachloroethane by the chlorine from the gaseous mixture.

5. A process as described in claim 1, further comprising radiating the uncondensed vapor mixture drawn off under (f) with ultraviolet light, in order to chlorinate any residual pentachloroethane vapors contained therein, thereby converting the latter vapors to solid hexachloroethane which is then separated.

References Cited
UNITED STATES PATENTS 2,826,546   3/1958   Walpert et al. _____ 55—71X
3,498,761   3/1970   Suryanarayana et al. __ 23—359

SAMIH N. ZAHARNA, Primary Examiner

R. W. BURKS, Assistant Examiner